(12) United States Patent
Arnold et al.

(10) Patent No.: US 7,009,818 B1
(45) Date of Patent: Mar. 7, 2006

(54) THIN FILM MAGNETIC HEAD HAVING IMPROVED THERMAL CHARACTERISTICS, AND METHOD OF MANUFACTURING

(75) Inventors: Carl Stephen Arnold, Golden, CO (US); Edward Virgil Denison, Erie, CO (US); April Lynn Alstrin, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 207 days.

(21) Appl. No.: 10/334,349

(22) Filed: Dec. 30, 2002

(51) Int. Cl.
*G11B 5/39* (2006.01)

(52) U.S. Cl. ............... 360/320; 360/319; 360/126

(58) Field of Classification Search ........... 360/320, 360/319, 323
See application file for complete search history.

(56) References Cited

U.S. PATENT DOCUMENTS

| | | | | |
|---|---|---|---|---|
| 5,247,413 A | * | 9/1993 | Shibata et al. | 360/319 |
| 5,351,158 A | * | 9/1994 | Shibata | 360/322 |
| 5,644,455 A | * | 7/1997 | Schultz | 360/320 |
| 5,805,390 A | * | 9/1998 | Takeura | 360/323 |
| 5,930,086 A | * | 7/1999 | Chaug et al. | 360/313 |
| 5,958,612 A | * | 9/1999 | Saito et al. | 428/692 |
| 5,963,401 A | * | 10/1999 | Dee et al. | 360/316 |
| 6,028,750 A | * | 2/2000 | Ohtsubo | 360/126 |
| 6,215,630 B1 | * | 4/2001 | Schultz et al. | 360/320 |
| 6,252,749 B1 | * | 6/2001 | Hayakawa | 360/320 |
| 6,396,660 B1 | * | 5/2002 | Jensen et al. | 360/126 |
| 6,396,670 B1 | * | 5/2002 | Murdock | 360/319 |
| 6,700,752 B1 | * | 3/2004 | Dimitrov et al. | 360/317 |
| 6,859,343 B1 | * | 2/2005 | Alfoqaha et al. | 360/126 |
| 2001/0043446 A1 | * | 11/2001 | Barlow et al. | 360/319 |
| 2002/0154451 A1 | * | 10/2002 | Dimitrov et al. | 360/317 |

FOREIGN PATENT DOCUMENTS

| | | | |
|---|---|---|---|
| JP | 05109026 A | * | 4/1993 |
| JP | 2000113426 A | * | 4/2000 |
| JP | 2002117509 A | * | 4/2002 |

* cited by examiner

*Primary Examiner*—Brian E. Miller
(74) *Attorney, Agent, or Firm*—Yee & Associates, P.C.

(57) ABSTRACT

A thin film magnetic head having one or more magnetoresistive (MR) elements. A thermally conductive stud is incorporated in an underlayer of the head, below the bottom shield of the MR element. This stud acts as a heat sink, and enhances the heat flow from the bottom shield to the substrate to thereby reduce thermal contact noise in the device, as well as allowing use of higher bias currents when reading signals from the media.

11 Claims, 2 Drawing Sheets

THIN FILM MAGNETIC HEAD HAVING IMPROVED THERMAL CHARACTERISTICS, AND METHOD OF MANUFACTURING

FIELD OF THE INVENTION

The present invention relates to magnetic storage devices, and more particularly, to magnetic storage devices which employ thin-film magnetic heads having one or more magneto-resistive (MR) transducer elements.

BACKGROUND OF THE INVENTION

Various types of magnetic storage devices employ thin-film heads, such as disk drives and tape drives. The thin-film head is typically composed of one or more read elements and one or more write elements used to read/write information on the tape media, such as that described in U.S. Pat. No. 5,963,401 entitled "Magnetic tape head assembly including modules having a plurality of magneto-resistive head elements" by Richard Dee et al., which is hereby incorporated by reference as background material. Writing is performed by delivering a write signal to one of the write elements. The write signal creates a variable magnetic field at a gap portion of the write element. This magnetic field induces magnetic polarity transitions into the desired media track to effectuate writing of data on the media.

Reading of data from the media is performed by sensing the magnetic polarity transitions on the media as the media is moved across a thin-film head in a longitudinal direction. The magnetic polarity transitions on the media present a varying magnetic field to a read transducer in the head. The read transducer converts the varying magnetic field into an analog read signal that is delivered to a read channel for appropriate processing. The read channel converts this analog signal into digital signal(s) that are then processed by a computer system.

In thin-film heads having a plurality of transducer elements, magneto-resistive (MR) elements are typically used to read information from the media, due to their increased sensitivity during a read operation. The resistance of an MR element varies almost linearly with an applied magnetic field. During a read operation, the MR element is held very near (in the case of disk) or in contact with (in the case of tape) the media, to sense the varying magnetic transitions on a particular track. A constant DC current is passed though the MR element resulting in a variable voltage across the MR element due to its varying resistance. By Ohm's law (e.g. V=IR), the variable voltage is proportional to the varying resistance of the MR element, and hence is representative of the data stored on a particular track of the media. This variable voltage signal, which is the read analog signal, is then processed and converted to digital form for subsequent processing.

A simple MR head consists of a thin film of magneto-resistive material, such as Permalloy, between two insulating layers or shields. When the MR layer is formed, a magnetic field is typically applied in a direction parallel to the plane of the thin layer. Thus, the MR layer exhibits a uniaxial anisotropy with an easy-axis of magnetization parallel to the direction of the applied field. If an external magnetic field, such as from a magnetic tape, is applied normal to the easy-axis, the magnetization direction of the MR layer will rotate away from the easy-axis and towards the direction of the applied magnetic field. This magnetization rotation causes a change in resistance in the MR layer. When no external field is applied, the resistance is greatest. The resistance decreases with increasing applied field. For practical geometries of the MR layer, resistance as a function of applied field traces a bell-shaped curve. The MR element is often biased with an applied current such that a zero magnitude applied field results in a resistance near an inflection point on the resistance curve. Thus, small changes about a zero magnitude applied external field result in nearly linear changes in resistance.

There are many variables that can adversely affect the performance of a media drive such as a disk drive or tape drive. Temperature variations of the MR element are one such variable with adverse consequences. Because MR elements have positive temperature coefficients, increases in the temperature of an MR element can cause in increase in the resistance of the MR element. Similarly, decreases in the temperature of an MR element can cause a decrease in the resistance of the MR element. Since the read voltage signal is proportional to variations in resistance of the MR element multiplied by the constant bias current, whenever the temperature of the MR element is increased or decreased, a thermal signal is generated which adversely adds or subtracts to the value of the desired analog signal being read.

In thin film tape heads, there is a kind of noise that is sometimes referred to as contact noise. Contact noise occurs when a bump on the tape hits the MR element (or shield adjacent thereto) and momentarily cools the device. This cooling causes a momentary decrease in resistance of the MR element, and thereby produces a voltage spike in the output of the element. This spike, if it is large enough, can cause errors in reading the data by the data channel. The magnitude of this temperature fluctuation is proportional to the temperature rise of the shields and MR element. Therefore, one factor that produces excessive contact noise is excessive MR element/shield temperature.

Because both magnetic data signals and thermal signals cause variations in the resistance of the MR element, there is a need to develop a method and apparatus that mitigates these undesired thermal signals and their resulting effects. The present invention is designed to overcome the aforementioned problems. There is yet another reason for improving transducer thermal characteristics. As track widths are narrowed and read sensors thinned, current density becomes an issue. It is desirable to drive as much current as possible through the sensor to get the greatest amplitude—thus providing an improved signal-to-noise ratio signal read from the media. If the read sensor could cool better, more current can be applied. The present invention is also designed to enhance the signal being read from the media.

SUMMARY OF THE INVENTION

It is an object of the present invention to provide an improved data storage device.

It is a further object of the present invention to provide an improved transducer for accessing information on a storage media.

It is another object of the present invention to provide an improved environment for an MR element that is used for reading data from a storage media.

It is yet another object of the present invention to provide an MR element having improved thermal characteristics.

It is a further object of the present invention to provide a data transducer with an integrated heat sink.

In accordance with the invention, a thin film head is provided having one or more MR elements. A thermally conductive stud is incorporated in an underlayer of the head, below the bottom shield of the MR element. This stud acts as a heat sink, and enhances the heat flow from the bottom shield to the substrate to thereby reduce thermal contact noise in the device, as well as allowing use of higher bias currents when reading signals from the media.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
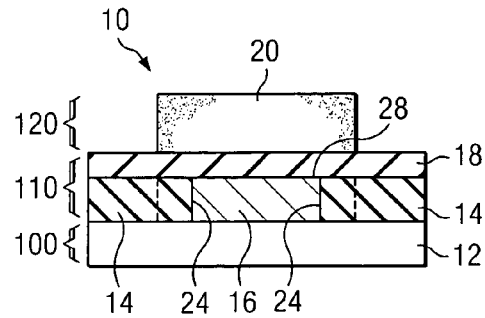
FIG. 1 depicts a side view of a partial thin-film magnetic head showing a thermally conductive stud.

Referring now to FIG. 1, a side view of a partial MR head is generally shown at 10. The MR element is not shown in this particular view, for better clarity in showing the details of the underlying conductive stud. Starting at the bottom and working up, thin-film head 10 comprises layer 100 that includes substrate 12, which is preferably composed of an AlTiC composite material. Above layer 100 is layer 110, which is preferably composed of an underlayer alumina portion 14, a thermally conductive stud 16, and an insulator alumina portion 18. Above layer 110 is layer 120, which comprises bottom shield 20, composed of a magnetically soft material such as CZT, FeN, NiFe, etc. Insulator alumina portion 18 insulates the thermally conductive stud 16 from bottom shield 20. However, other materials exhibiting similar insulating properties could also be used, such as SiC and aluminum nitride.

Figure 2:
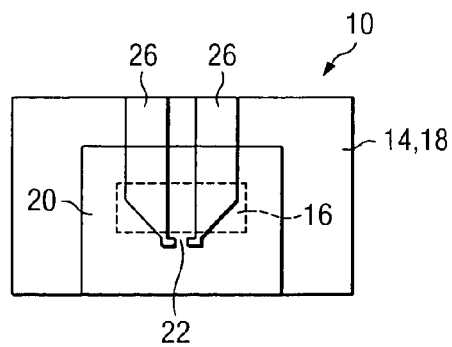
FIG. 2a depicts the partial thin-film magnetic head of FIG. 2, with inclusion of a second magnetic shield layer disposed above the MR element.
FIG. 2b depicts standard insulating layers disposed between an MR element and the magnetic shield layers of a thin-film magnetic head.
Figure 2A:
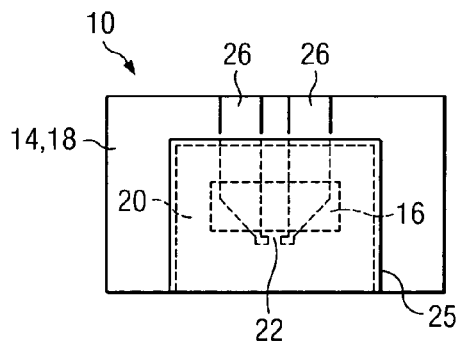
Figure 2B:
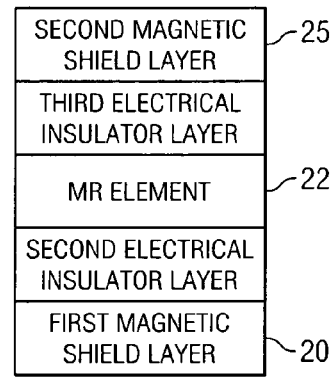

Referring now to FIG. 2, a top view of a partial thin-film head 10 is depicted. The underlying alumina layer 14 and insulator alumina layer 18 are shown together, since the same material (alumina) is used for both the underlying layer and the insulating layer immediately above such underlying layer. The thermally conductive stud 16 is shown, with the dotted line showing its footprint when viewed from the top. This thermally conductive stud is part of the layer 110 (FIG. 1) that also includes the underlying alumina layer. The thermally conductive stud 16 is beneath insulating alumina layer 18, which is relatively thin to ensure excellent thermal conductivity. The bottom CZT shield extends across the entire surface of the underlying stud 16, and further extends toward the bottom of this top view to provide an area for locating the MR element 22 such that the MR element is laterally displaced from the underlying stud region 16. Finally, conductor legs 26 are shown, which provide an outside electrical connection to the MR element 22. A top shield over the MR element 22 is not shown, for ease of clarity in seeing the relationship between the MR element 22 and underlying stud 16. FIGS. 2a and 2b show this top shield at 25. FIG. 2b also depicts standard electrical insulating layers disposed between the MR element 22 and the shields.

Figure 4A:
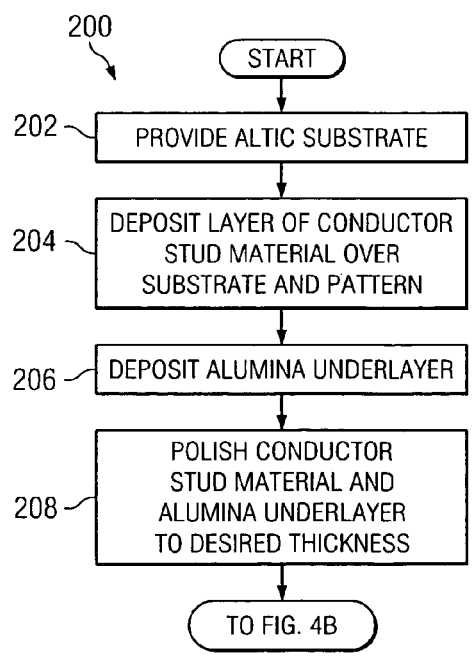
FIGS. 4a–4b are a flowchart describing various thin-film magnetic head manufacturing steps.
Figure 4B:
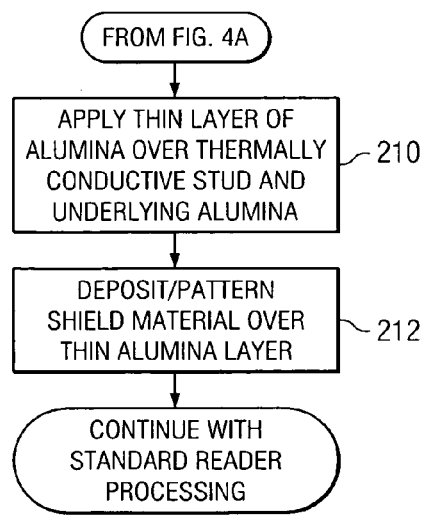
Figure 3A:
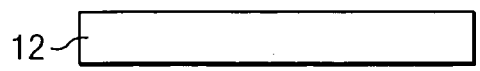
FIGS. 3a–3g depict a thin-film magnetic head during various manufacturing steps.
Figure 3B:
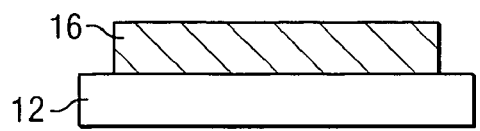
Figure 3C:
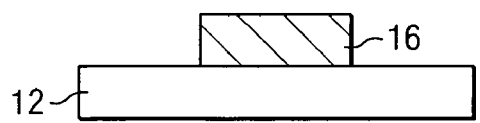
Figure 3D:
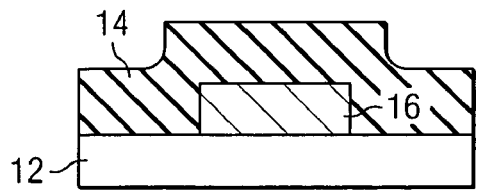
Figure 3E:
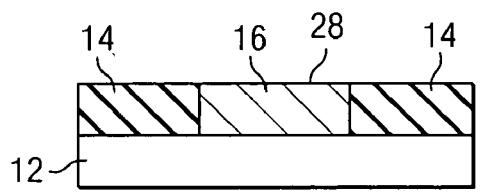
Figure 3F:
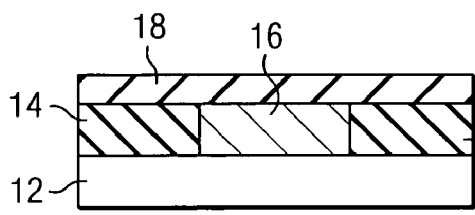
Figure 3G:
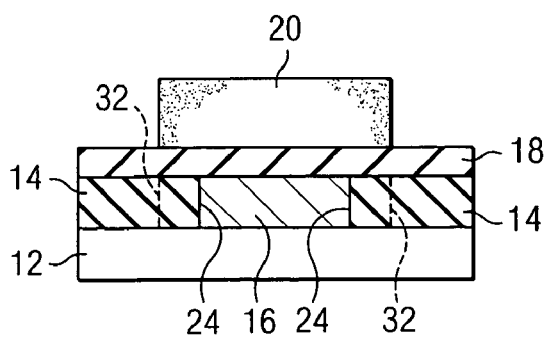

In manufacturing the thin-film head 10, and referring now to FIGS. 3a–3g and the flow chart shown in FIGS. 4a–4b, the starting point is an AlTiC wafer or substrate material 12 as shown in FIG. 3a. A layer of conductor stud material 16 is deposited on the substrate at step 204 and shown in FIG. 3b, and then patterned as shown in FIG. 3c. These studs 16 are plated up following standard processing techniques (i.e. seedlayer deposit, photo definition, electroplating, resist strip). The resulting studs should be slightly taller than the final underlayer thickness, to accommodate a subsequent polishing step. The studs should be formed using materials having good thermal conductivity, such as copper or aluminum. An alumina underlayer 14 is then deposited over the stud material 16 and substrate 12 at step 206 and shown in FIG. 3d. The deposition thickness is greater than the final desired thickness to ensure stud encapsulation. The alumina underlayer is then polished at step 208 using a standard CMP process to remove the excessive underlayer material and obtain the desired underlayer thickness, and to expose the top 28 of conductor stud 16. A thin (i.e. 100–2,000 angstrom) insulating layer of alumina 18 is then deposited over the entire wafer at step 210 and shown in FIG. 3f. Again, any material having suitable insulating properties may be used in lieu of alumina. A layer of magnetically soft material such as CZT, FeN or NiFe is then deposited above the thin alumina layer 18, and patterned using traditional techniques at step 212, to form bottom shield 20 as shown in FIG. 3g. The outer footprint of the resulting bottom shield 20 should extend outward from the stud sidewalls 24 at least 20 microns, as shown at 32 in FIG. 3g, to ensure that the stud is protected from later processing steps.

The thin alumina layer 18 thus prevents electrical shorting of the bottom shield 20 to the substrate 12, since there is now an electrically conductive layer 16 between the bottom shield 20 and the substrate 12. Prior thin-film heads had no need for this thin insulating layer, as the only material between the bottom shield and the substrate was an insulating material such as alumina— i.e. there previously was no thermally conductive stud which is also electrically conductive, and hence no need for further electrical isolation between the bottom shield and substrate.

From this point on, standard reader processing is used to complete manufacture of the MR transducer, and is not described in detail as such processing is well known to those of skill in the art. It should be noted, however, that the MR element is laterally displaced from the underlying stud 16 to ensure that the topology from the boundary between the stud 16 and the underlying alumina 14 does not propagate to the MR element where it could influence the magnetics of the sensor. This lateral displacement can more clearly be seen when viewing the top view of the thin-film head shown in FIG. 2, where the MR element 22 is shown to be outside the dotted stud region 16.

It is also possible to create the conductive stud 16 beneath the shield 20 in many other ways. The conductive stud material could be deposited by sputtering, evaporation, ion beam deposit, etc. Alternatively, the underlayer 14 could initially be deposited on the substrate 12 and patterned to create voids. The conductive stud material 16 is then deposited to fill the voids, and polished, followed by deposition of the thin insulating layer 18 and formation of the bottom shield 20.

It has thus been shown how a thin-film head can be built that has improved characteristics by mitigating undesired thermal events that would otherwise cause improper data detection when reading information stored in a magnetic media.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A thin film magnetic head, comprising:
    a substrate;
    a first magnetic shield layer;
    a thermally conductive stud disposed between the substrate and the first magnetic shield layer, wherein contact between the first magnetic shield layer and the thermally conductive stud is absent; and
    an electrical insulator layer disposed between the first magnetic shield layer and the thermally conductive stud, wherein the electrical insulator layer provides electrical insulation between the first magnetic shield layer and the thermally conductive stud.

2. The thin film magnetic head of claim 1, further comprising:
    an MR element disposed above the first magnetic shield layer; and
    a second magnetic shield layer disposed above the MR element.

3. The thin film magnetic head of claim 2, further comprising:
    a second electrical insulator layer disposed between the MR element and the first magnetic shield layer; and
    a third electrical insulator layer disposed between the MR element and the second magnetic shield layer.

4. The thin film magnetic head of claim 1, wherein the thermally conductive stud is electrically conductive.

5. The thin film magnetic head of claim 4, wherein the thermally conductive stud comprises copper.

6. The thin film magnetic head of claim 4, wherein the thermally conductive stud comprises aluminum.

7. The thin film magnetic head of claim 1, wherein the electrical insulator layer comprises alumina.

8. The thin film magnetic head of claim 1, wherein the electrical insulator layer comprises a thin electrical insulator layer between the stud and the first magnetic shield layer.

9. A method of producing a thin film magnetic head, comprising the steps of:
    forming a substrate layer;
    forming a thermally conductive stud above the substrate;
    forming an electrical insulator layer above the thermally conductive stud;
    forming a magnetic shield layer above the electrical insulator layer such that the electrical insulator layer provides electrical insulation between the thermally conductive stud and the magnetic shield layer, wherein contact between the magnetic shield layer and the thermally conductive stud is absent and wherein the electrical insulator layer is between the magnetic shield layer and the thermally conductive stud; and
    forming a read element above the magnetic shield layer.

10. The method of claim 9, wherein the read element is a magneto-resistive element.

11. A method of using a thin film magnetic head to process data on a magnetic tape media, said method comprising the steps of
    contacting a magnetic tape with a thin film magnetic head, said magnetic tape having data, said thin film magnetic head comprising:
        a substrate;
        a first magnetic shield layer;
        a thermally conductive stud disposed between the substrate and the first magnetic shield layer, wherein contact between the first magnetic shield layer and the thermally conductive stud is absent; and
        an electrical insulator layer disposed between the first magnetic shield layer and the thermally conductive stud, wherein the electrical insulator layer provides electrical insulation between the first magnetic shield layer and the thermally conductive stud; and
    accessing the data on the magnetic tape with the thin film magnetic head.

* * * * *